Figure 1:
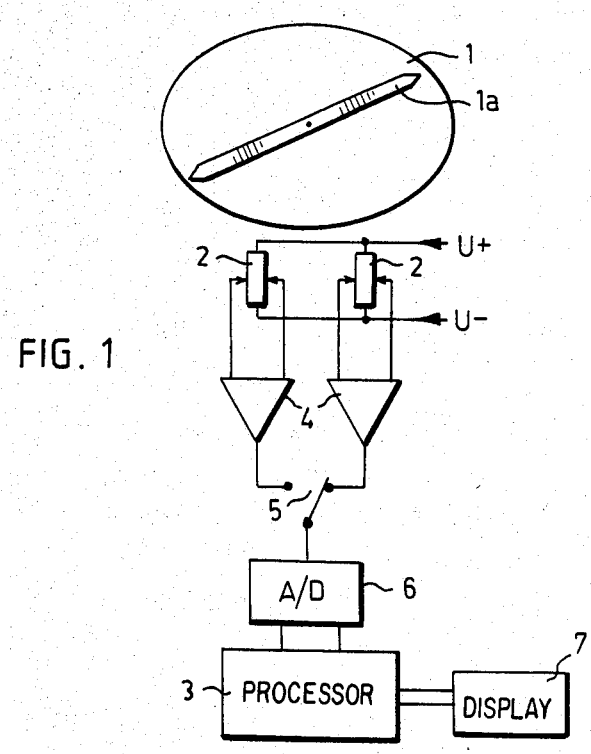

United States Patent [19]

Tanner et al.

[11] Patent Number: 4,640,016

[45] Date of Patent: Feb. 3, 1987

[54] MEANS FOR INDICATING DIRECTION AND A METHOD OF DETERMINING A DIRECTION

[76] Inventors: Risto Tanner, Lukupuronrinne 2 A 2, 02200 Espoo; Hannu Purhonen, Visamäki 4 A 6, 02130 Espoo, both of Finland

[21] Appl. No.: 810,913

[22] Filed: Dec. 18, 1985

[30] Foreign Application Priority Data

Dec. 19, 1984 [FI] Finland .................................. 845043

[51] Int. Cl.⁴ .............................................. G01C 17/38
[52] U.S. Cl. .................... 33/356; 33/363 Q
[58] Field of Search ............. 33/363 Q, 363 R, 355 R, 33/355 D, 361, 356

[56] References Cited

U.S. PATENT DOCUMENTS

4,232,451 11/1980 Thomsen .......................... 33/363 R
4,445,279 5/1984 Tsushima et al. ................ 33/363 Q Primary Examiner—Willis Little Attorney, Agent, or Firm—Kane, Dalsimer, Kane, Sullivan and Kurucz

[57] ABSTRACT

A remote indication compass, a sensor of which is formed by a magnetic compass (1) and magnetoresistive sensors (2) attached thereto, by means of which sensors the field created by the magnetic compass is measured. The signal of the sensors is analogous as well as cyclic with respect to the angle between the fastening plate of the sensors and the northern direction indicated by the magnetic compass, the length of a cycle being 360°. The angle between the sensors is selected in such a manner that the flat areas of the signals do not coincide.

The sensor signals are amplified and digitalized and scaled. The determination of direction is carried out by comparing the sensor readings to tabulated sensor readings corresponding to different directions or alternatively by comparing the ratio of the sensor readings to the ratios of the tabulated sensor readings. The direction data so obtained is further corrected by means of a deviation correction table created in the operating condition and stored in a memory.

8 Claims, 10 Drawing Figures

MEANS FOR INDICATING DIRECTION AND A METHOD OF DETERMINING A DIRECTION

The invention relates to a means for measuring a desired direction, e.g. an angle between the direction of motion and the map north. More particularly, the arrangement in question is a sensor arrangement used for indicating direction in combination with a magnetic needle or any rotating piece made of a non-magnetic material.

The invention will be described in the following with reference to an arrangement, wherein a conventional magnetic compass is used to indicate the direction of the horizontal component of the magnetic field of the earth. However, it is to be understood that any rotating piece made of a non-magnetic material and provided with a small magnet can be used in place of the magnetic needle of the compass. Accordingly, even though a compass is referred to in the following, this must be taken as a working example which, however, does not in any way restrict the means for indicating direction according to the invention.

Compasses resembling the compass according to the invention are classified as transmitting compasses in the book "Magnetic Compasses and Magnetometers" by Alfred Hine, University of Toronto (1968). The transmitting compasses are further grouped into compasses using a magnetic compass as a primary sensing element on one hand, and compasses using primary sensing elements based on electromagnetic induction on the other hand.

Known sensor arrangements for producing a signal or signals indicating direction from a magnetic compass include e.g. the following:

(a) Arrangements based on a sensor magnet, wherein a sensor magnet forming part of a signal generator turns in accordance with a field produced by the proper compass magnet, thus controlling the signal generator. The signal generator can be formed e.g. in accordance with the point b or c listed below.

(b) A capacitive arrangement, wherein the compass either forms part of a capacitor or capacitors or the compass controls an adjustable capacitor or capacitors when it turns.

(c) Resistive arrangements, wherein the compass forms part of a fluid resistance bridge or wherein it controls a potentiometer suited for the purpose.

(d) An optic arrangement, wherein the compass rose and an opening/openings provided therein let in light on phototransistors in different ways depending on the angle between the phototransistors and the compass rose. Information on the direction is obtained by mechanically turning the photodetectors until the desired standard situation is restored.

(e) An optic arrangement, wherein an optic code plate is fastened on the compass, the position of which plate is read by means of photodiodes and phototransistors.

(f) An inductive arrangement, wherein a magnetic field created by the compass controls a direction signal or signals by means of coil arrangements.

The signal(s) obtained can either be used for directly controlling remote indication or, alternatively, the signal(s) is (are) amplified or otherwise treated before the use thereof for the control of the remote indications. Particularly different kinds of automatic control devices are often provided with an arrangement wherein a sensor element producing a direction signal is turned in accordance with the turning of the magnetic compass in such a manner that the value of the signal produced by the sensor element is maintained constant (north seeking compasses). The direction can thereby be judged from the sensor.

Compasses based on the principles described above have certain disadvantages which can be considerably improved by means of the compass according to the invention:

arrangements, wherein the remote indication is controlled directly by means of an analogous signal obtained from the sensor arrangement, are often inaccurate because of the weakness of the signal controlling the indication arrangements, wherein the sensor is turned so as to maintain the desired signal value (north seeking magnetic device) require sensor turning mechanisms in analogous arrangements in general, direction data cannot be recorded e.g. in view of the determination of the mean course a magnetic compass with the sensors thereof is often too large for use in e.g. small boats an arrangement based on an optic code plate complicates the manufacture of the magnetic compass the power consumption of most electrical compasses prevents the application thereof in case the power consumption must be restricted. A sailing boat may serve as an example on such operating conditions.

A decisive improvement with respect to the disadvantages disclosed above is achieved by means of the compass according to the invention. For the achievement thereof, the device according to the invention is mainly characterized by the disclosure of the characterizing portion of claim 1. The method according to the invention, in turn, is characterized by the disclosure of the characterizing portion of claim 5.

The following matters can be mentioned as the most important advantages of the invention:

the magnetic compass with the sensors thereof can be smaller than a normal boat compass. If desired, it can be placed so that the reading is taken directly from the magnetic compass, electrically produced direction data being used solely in demanding conditions or for the needs of the automatical control devices the sensors, processing devices and the indication can be marketed also as an auxiliary equipment for magnetic compasses of pre-chosen types declination and deviation are digitally taken into consideration. No compensating magnets or other such mechanisms are needed. Tuning of the compass with respect to declination and deviation is effected at the place of application, the tuning result being recorded in a permanent memory direction data is obtained in digital form, which enables the utilization thereof for various purposes. For example, the number and kind of remote indications is by no means technically restricted the sensor system is both mechanically and magnetically detached from the compass magnets, whereby it does not disturb the operation of the magnetic compass the temperature stability of the used sensors is good and analogous treatment of signals is limited. Thus the stability of the entire system is good all electrical functions can utilize the same direct current voltage source, and the power consumption of the sensor system according to the invention is small as compared with most known arrangements.

The invention will be more closely described in the following with reference to the attached drawings.

Figure 2:
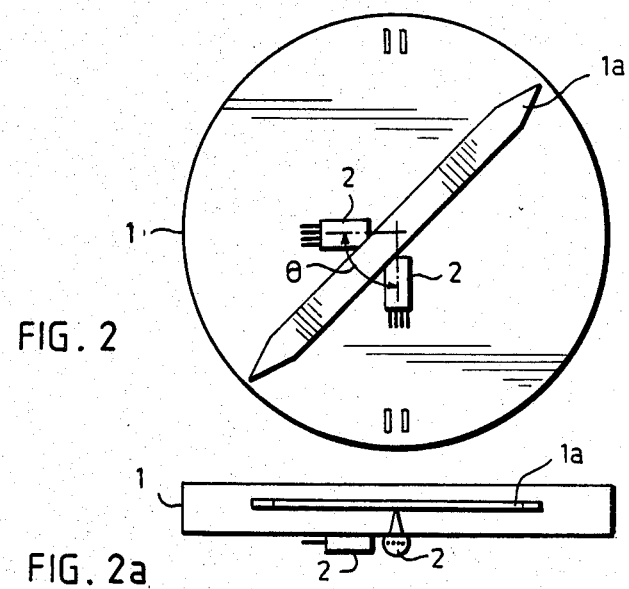
Figure 2A:
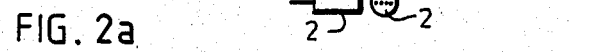
Figure 3A:
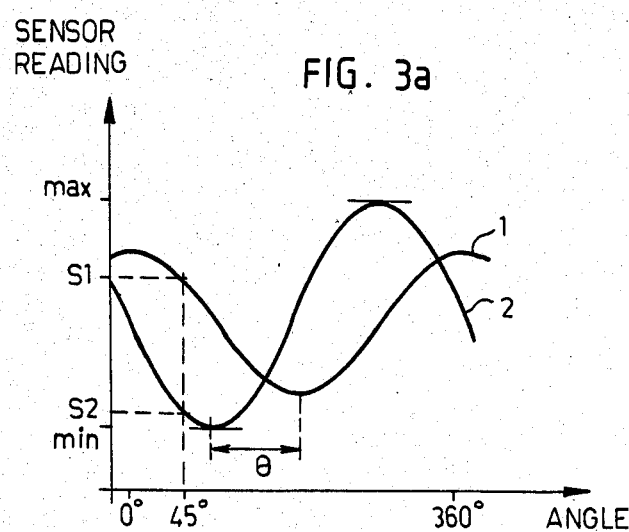
Figures 3B, 3C:
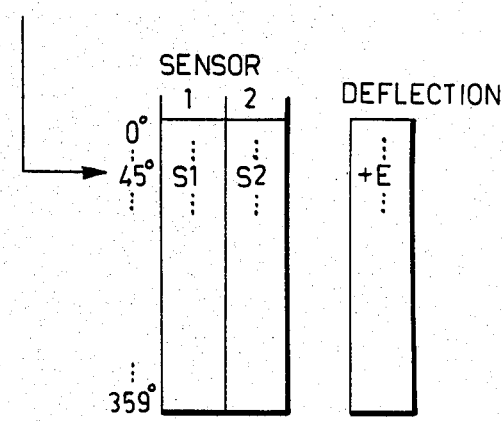
Figure 4A:
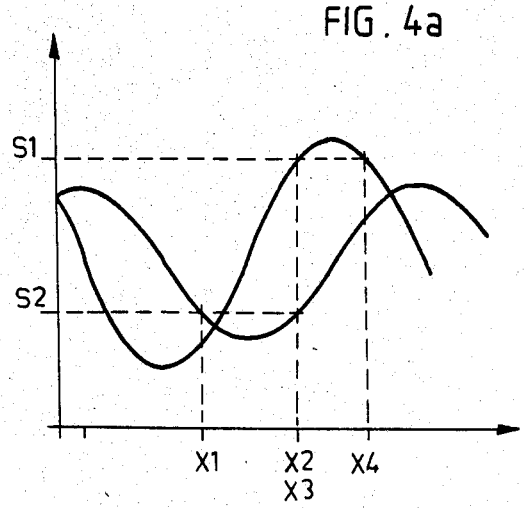
Figure 4B:
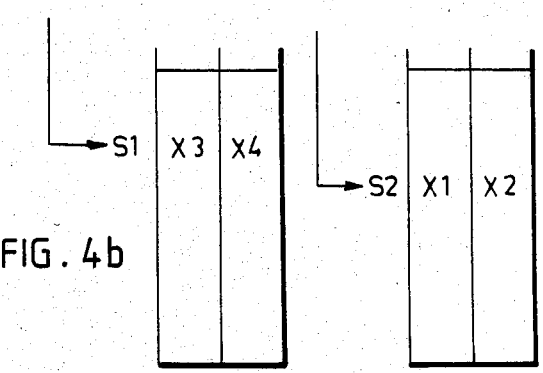
Figure 5A:
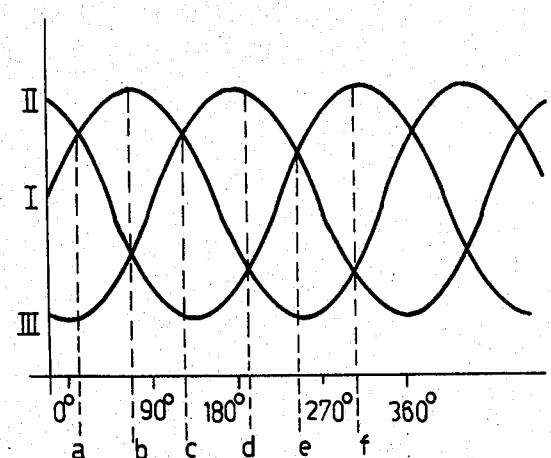
Figure 5B:
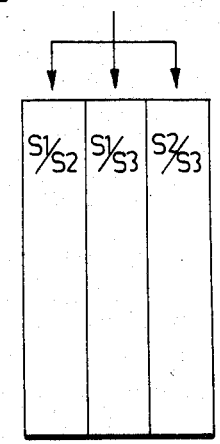

FIG. 1 schematically illustrates the overall arrangement of the compass when a needle compass and two detectors are used, FIG. 2 is an example of the attachment of the detectors to a magnetic compass when a needle compass is used, FIG. 2a is a side view of the example of FIG. 2, FIGS. 3a, 3b and 3c illustrate an example of signals obtained from the sensors as a function of the angle between the northern direction indicated by the magnetic compass and the fastening plate of the sensors and, further, tables, on the use of which the method I for determining direction is based, FIGS. 4a, and 4b illustrate signals obtained in the method II for determining direction and the table which is used, FIGS. 5a and 5b illustrate signals obtained in the method III for determining direction and the table which is used.

According to FIG. 1, a normal needle compass 1 or some other such magnetic compass is used as a primary direction sensor, said needle being indicated by the reference numeral 1a. Two or more magnetoresistive sensors 2 are secured under the compass, depending on the principle applied in the treatment of the signals. Said sensors are fastened on the frame of the compass and connected to a direct current source which is indicated by the references U+ and U−. If there are more than two sensors, these are coupled to a processor 3 and to a display 7 on the same principle as the sensors in FIG. 1. Signals obtained from the sensors are led to amplifiers 4 according to FIG. 1 and further to an A/D -converter 6 via a selector 5. A sufficient accuracy is achieved by means of an 8-bit converter. Possible circuits for the temperature compensation of the sensors are not shown in the figure.

FIG. 2 illustrates in more detail the positioning of the sensors when a needle compass 1 and two sensors 2 are used. Philips' magnetoresistive sensor (Philips: Electronic components and materials, Technical publication 102) is used as sensing means in this specific case. The sensor functions as a resistance bridge, the electrical resistances of the resistors thereof varying as a function of the magnetic field directed to the resistors. The voltage signal obtained from the terminals of the resistance bridge is a function of the field produced by the magnetic compass. The value of the signal is dependent on the angle between the sensor and the magnetic north indicated by the magnetic compass in such a manner that the signal is cyclic, the length of one cycle being 360°. The signal resembles a sinusoidal curve to some extent.

FIG. 3a shows an example of signal values obtained as a function of the angle with the needle compass and the two sensors. In the set of curves of FIG. 3a, the y-axis represents the strength of the sensor signal and the angle is represented by the x-axis. The curve 1 illustrates a signal obtained from the sensor 1 and the curve 2 a signal from the sensor 2. The amplitude and the shape of the signal may deviate from the case of the example within the manufacturing tolerances of the sensor and the variations caused by the fastening point of the sensor. In addition, the shape of the signal is different with different kinds of magnetic compasses. The positioning of the sensors in the compass and with respect to each other is by no way critical. However, the best end result is obtained by positioning the sensors adjacent the axis of the compass and in such a manner with respect to each other that the flat areas of the signals do not coincide. An advantageous phase difference (the angle $\theta$ in FIG. 2 and FIG. 3a) is 90° with two sensors and 120° with three sensors.

FIGS. 1 and 2 illustrate positioning of the sensors in case of a needle compass. Many compasses used in navigation, however, comprise two parallel magnets which are symmetrically disposed with respect to the the suspending point. The sensor system according to the invention is applicable also in such cases. Depending on the positioning of the sensors, the signal may thereby deviate from the one described above so that it includes two maximum and two minimum points per one cycle of 360°. An advantageous place for positioning the sensors in this kind of compasses must be found out separately for each particular compass type. The phase differences can be selected as above: 90° with two sensors and 120° with three sensors.

The sensor solutions shown in FIGS. 1 and 2 only serve as examples. Technically, it is possible to manufacture a sensor in which all the magnetoresistive elements and an appropriate portion of the signal processing means are integrated on the same circuit.

A binary sensor value combination obtained from two sensors unambiguously defines the angle between the fastening plate of the sensors and the magnetic north indicated by the compass.

The determination of the angle is based on numeric table search methods which are described below. Such table search methods require that the level and shape of the signals is maintained stable.

The level of the signals can be checked and, if desired, modified to correspond to the tabulated reference values by turning the compass around in a special test mode, whereby the processor reads the sensor values continuously and determines a minimum and a maximum reading for each sensor. By comparing these to the recorded minimum and maximum values of the sensors, it can be found out whether the function of the combination of the sensor and the magnetic compass has remained unchanged. The desired level of the signal and the desired area of application can be obtained by correcting the value obtained from the A/D-converter in accordance with the following formulae (1) . . . (3)

References:
Q: Scaled sensor reading
X: Reading obtained from the A/D-converter
$MIN_X$: Minimum value obtained from the A/D-converter
$MAX_X$: Maximum value obtained from the A/D-converter
$MIN_R$: Minimum value of the recorded reference signal
$MAX_R$: Maximum value of the recorded reference signal
V1: Constant, by means of which the desired minimum value of the reading is obtained
V2: Constant, by means of which the desired amplitude is set (1) $Q = V1 + V2 \cdot (X - MIN_X)$
(2) $V1 = MIN_X$
(3) $V2 = (MAX_R - MIN_R)/(MAX_X - MIN_X)$ The processor determines the value of V1, $MIN_X$ and V2 automatically in the test mode.

Three alternative methods for the determination of direction will be disclosed in the following. For practical reasons, direction is determined in each method in two stages. At the first stage, a table or tables are used, which are created on the attachment of the magnetic compass and the sensors to each other (FIGS. 3b, 4b, 5b). At the second stage, obtained direction data is corrected by means of a correction table created in the operating conditions in question (FIG. 3c).

The determination of direction is carried out according to a program on the basis of sensor readings scaled as described above. The used tables and programs are recorded in a non-volatile memory. A suitable memory type is e.g. EEPROM, in which the deviation correction table (FIG. 3c) dependent on the operating conditions can be practically stored.

Method I for the Determination of Direction by Means of Two Sensors

On attachment of the magnetic compass to two magnetoresistive sensors, a table is created, wherein the values of the two sensors are stored for each one of the compass directions chosen at sufficiently small intervals. A suitable interval is 5 or 10 degrees. The shape of the table appears from FIG. 3b. Room for 360 pairs of sensor values is provided in the table. Said pairs of sensor values are stored on table lines corresponding to the angle in question. For the sake of clarity, the scaling of the sensor readings has not been taken into account in FIGS. 3a and 3b nor in FIGS. 4a, 4b and 5a, 5b.

Another table is created in the operating conditions for the elimination of both deviation and deflection. The combined deviation and deflection prevailing in the selected compass directions is stored in the table (on lines corresponding to said compass directions). FIG. 3c provides an example of this table, which in the following will be called a deviation correction table.

The method for the determination of direction operates is such a manner that a pair of values which in the best possible way corresponds to the pair of obtained sensor values is looked up in the table according to FIG. 3b. The angle between the northern direction indicated by the magnetic compass and the fastening plate of the sensor corresponds to the serial number (numbering is started from 0) of that horizontal line of the table on which the best combination of sensor values is found. Before the direction data is transferred to the indicating means, the sum of deviation and deflection is subtracted therefrom, which sum corresponds to the direction in question in the deviation correction table of FIG. 3c. Depending on the application in each particular case, filtration of the direction data may be necessary before the indication thereof.

In order to make the table search easier, the tables according to FIGS. 3b and 3c are completed so that all positions include values corresponding to the direction in question. The completion is carried out under the assumption that the sensor values (FIG. 3b) and the combined deviation and deflection values are linear between the measured directions. The error caused by the linearity assumption is the smaller, the more densely the intervals between the measured values stored in the table are set.

Details of the direction search method can be varied wihtout changing tha basic idea. This idea can be expressed as follows:

The direction determination is carried out by means of a sensor, the reading of which is closer to the average value of all readings of the sensor in question. Thereby the used area is always such that the direction dependence of the sensor reading is nearly linear.

Because the sensor values are cyclic, one cycle being 360°, a reading of the other sensor is needed to determine, whether the direction to be found out is within the area of the first or the second half of the cycle.

Because the magnetic compass has its own inertia and, depending on the application, the fastening plate of the compass does not, either, turn particularly quickly, subsequent direction values can be looked for near each other. If the processing of the direction data also otherwise takes place sufficiently rapidly, this property need not be utilized (point 1 in the algorithm).

The direction determination method I is described below in the algorithmic form.

The following references are used:

S(i): Reading of the sensor i, i=1 ... 2

ASTE(j,i): Table according to FIG. 3b, which is completed with the missing sensor value combinations, j=0 ... 359, i=1 ... 2

PUO(i): Average value of the tabulated readings ASTE (j,i) of the sensor i, i=1 ... 2

KOR(j): Deviation correction table according to FIG. 3c, in which table a correction term is stored for each direction, j=0 ... 359

APROK: Direction approximation determined by means of the table ASTE (j, i)

SUUNTA: Corrected direction data

The algorithm is carried out in the following order:

0. The detector values S(1) and S(2) are read and scaled.
1. If the compass has been brought into operation at an earlier stage and the direction approximation APROK has a value, A and B are set A=APROK−5 and B=APROK+5. If A or B does not fall within the range 0 ... 359, the variable which has obtained a value outside said range is given a value 0 or 359, depending on which one is closer to the value calculated above. The direction determination is continued under point 5.
2. If S(1) is proportionally closer to PUO(1) than S(2) to PUO(2), K is set K=1 and L is set L=2, otherwise K=2 and L=1.
3. The ASTE (j, K) values are scanned beginning from the value ASTE (0,K) up to the value ASTE (359, K) with intervals of 20 degrees until the sign of the difference S(K)−ASTE(j, K) is reversed. Thereby the value of B and A is set B=j and A=the preceding used value of j. If the difference is 0 with some of the used values of j, C=j is set.
4. It is tested whether the sign of the following differences is the same: S(L)−PUO(L) and ASTE(A,L)−PUO(L). If the sign is the same and the variable C has obtained a value in point 3 above, APROK=C is marked and point 6 is entered upon. If the sign is the same, but the variable has not obtained a value at point 3 above, the algorithm is continued from point 5. If the differences have reversed signs, scanning of the table ASTE(j, K) is continued under point 3.
5. The ASTE(j,K) values are scanned with intervals of 1 degree within the range j=A ... B, until the absolute value of the difference ASTE(j, K)−S(K) reaches the minimum thereof. After the minimum has been reached, APROK=j is set and point 6 is entered upon. In case no minimum is found, point 3 is returned to.
6. It is checked that ASTE(APROK,L)=S(L) with a sufficient accuracy (necessary only when using a 2-magnet compass). If the condition is not fulfilled, scanning of the table ASTE is continued under point 3. If the condition is fulfilled, SUUNTA=APROK−KOR(APROK) is calculated and a new direction determination is started from point 0.

Method II for the Determination of Direction by Means of Two Sensors

The method is based on the same table of FIG. 3b as in the preceding method, the table being completed to include all directions between 0 and 359 degrees as described above. Instead of determining the direction directly by means of this table, two further tables are created therefrom, the form and contents of which are illustrated in FIG. 4b.

The basic idea is to provide each sensor with a table, in which direction readings for every possible sensor reading are stored. Because the sensor signal is cyclic and the length of one cycle 360°, every sensor value (with the exception of the minimum and maximum values) corresponds to two direction readings. The aforedescribed tables are created on combining the magnetic compass and the sensors to each other. With a 2-magnet compass, even four direction readings can correspond to one sensor reading, depending on the positioning of the sensors.

Only the case of a 1-magnet needle compass is treated in the following.

The principle of the direction determination method appears from FIGS. 4a and 4b. In FIG. 4a, the y-axis represents the strength of the sensor signal and the x-axis the angle similarly to FIG. 3a. The curves represent the signals obtained from the sensors. Directions X3 and X4 correspond to the sensor reading S(1) and directions X1 and X2 to the sensor reading S(2). Two of the directions X1 . . . X4 must be identical (within a certain tolerance). It remains to find out these two directions and determine, which one is more reliable, i.e. with respect to which direction the sensor reading is within the linear range.

The algorithm is carried out in the following order:
0. Sensor values S(1) and S(2) are read and scaled.
1. The minimum of the following differences is found out (by the use of the references of FIG. 4): |X1−X2|,|X1−X4|,|X2−X3|,|X2−X4|.
2. That one of the factors of the minimum difference is selected, the corresponding sensor value of which is proportionally closer to the average value of all values of said sensor. APROK is set equal to the selected factor of the minimum difference (in the case of FIG. 4 X2).
3. Calculate SUUNTA=APROK−KOR(APROK). Return to point 0.

The table KOR used under point 3 is described in connection with the method I for the determination of direction.

An advantage of the method II for the determination of direction is the quickness thereof, because no iteration is needed. A disadvantage thereof is that it needs more memory space as compared with the method I for the determination of direction.

Method III for the Determination of Direction by Means of Three Sensors

One way of compensating possible changes in the signal levels is to determine the direction on the basis of the ratio of the readings of two sensors. Thereby at least three sensors are needed, whereby those two thereof are used which are closest to the average value of all values of said sensors, i.e. are positioned within the linear range.

On account of the cyclic nature of the signals, the ratio of the signals of two sensors obtains the same value at two points of the cycle. The third sensor is used when one of these points is selected (cf. FIG. 5a). In FIG. 5a, the y-axis represents the strength of the sensor signal and the x-axis the angle similarly to FIGS. 3a and 4a above. The curves I and II and III represents signals obtained from the three different sensors.

The basic table used in the method is the table according to FIG. 3b applied to three sensors. On attachment of the magnetic compass to the sensors, a new table is calculated on the basis of this table, which new table comprises the following ratios stored for each angle (0 . . . 359) in accordance with FIG. 5b:

S(1)/S(2): the reading of the sensor 1 divided by the reading of the sensor 2

S(1)/S(3): the reading of the sensor 1 divided by the reading of the sensor 3

S(2)/S(3): the reading of the sensor 2 divided by the reading of the sensor 3

The same references as with the method I for the determination of direction are used with the exception of the ASTE-table:

ASTE(j, k): Table according to FIG. 5b, the above ratios being stored therein for each direction j. j=0 . . . 359 and k=1 . . . 3.

The algorithm is carried out in the following order:
0. Sensor values S(1) . . . S(3) are read and scaled.
1. If the compass has been brought into operation at an earlier stage and the direction approximation APROK has a value, the value of A and B is set A=APROK−5 and B=APROK+5. If A or B does not fall within the range 0 . . . 359, the variable which has obtained a value outside said range is given a value 0 or 359, depending on which one is closer to the value calculated above. The direction determination is continued under point 4.
2. Those two readings which fall proportionally closest to the average value PUO(1) . . . PUO(3) of the readings of the same sensors are selected out of the sensor readings S(1) . . . S(3) for the calculation of the ratio. The ratio of the selected sensor readings is calculated in the same order in which they are recorded in the table ASTE(j, k). Said ratio is indicated by the letter L. A corresponding value is set for k, which value will be indicated by K below.
3. The values ASTE(j,K) are scanned beginning from a value ASTE(0, K) up to a value ASTE(359, K) with intervals of 20 degrees until the sign of the difference L-ASTE(j, K) is reversed. Thereby the value of B is set B=j and A is set equal to the preceding used value of j. If the difference is 0 with some used value of j, C=j is set.
4. The values ASTE(j, K) are scanned with intervals of 1 degree within the range j=A . . . B until the difference ASTE(j, K)−L reaches the minimum thereof. After the minimum has been reached, APROK=j is set and point 5 is entered upon. If said minimum is not reached, scanning of the values ASTE(j, K) is continued under point 3.
5. M=1 . . . 3 is selected in such a manner that M is not equal to K. The value ASTE(APROK, M) is compared to a corresponding ratio calculated from the sensor readings. If these are sufficiently close to each other, SUUNTA=APROK−KOR(APROK) is calculated and a new direction determination is started from point 0. If the ratios are not sufficiently close to each other, scanning of the table ASTE(j, K) is continued under point 3.

Even if the invention has been described above with reference to an arrangement, in which the primary sensing means is formed by a magnetic compass, the invention is not restricted to be used in connection with compasses only, but it can be modified within the scope of the attached claims. So it is possible according to the invention to measure e.g. the direction of wind if an indicator of a non-magnetic material and provided with a magnet is used in place the magnetic needle of a compass, whereby said indicator turns with the wind.

We claim:

1. Advice for the determination of direction, comprising:
    a turnable indicator having magnetic properties mounted to a frame,
    two or more sensors, the operation of which is based on the dependence of the resistance of the magnetic material on a magnetic field exerted thereon, the sensors being secured on said frame and located on a plane parallel with the turning plane of the turnable indicator,
    an A/D-converter for converting the sensor values into digital form, the input of said converter being connected to the sensors,
    a signal treating processor connected to the output of the A/D-converter, which signal treating processor has in its memory at least one predetermined table, on the basis of which the processor determines a preliminary direction approximation, and a predetermined correction table for correcting the preliminary direction approximation, and
    a display for displaying the corrected direction data, said display being connected to the output of the signal treating processor.

2. The device according to claim 1, characterized in that said sensors consist of a bridge coupling formed by magneto-resistive elements.

3. The device according to claim 1 or 2, characterized in that two sensors are provided and that the phase difference therebetween is 90°.

4. The device according to claim 1 or 2, characterized in that three sensors are provided and the phase difference therebetween is 120°.

5. The device according to claim 1, characterized in that the turnable indicator is a magnetic needle.

6. A method for the determination of direction using a turnable indicator and two or more sensors secured on a frame and the operation of which is based on the dependence of the resistance of the magnetic material on a magnetic field exerted thereon, said method comprising the steps of:
    modifying the signals obtained from the sensors into digital form by means of an A/D-converter,
    scaling the sensor readings obtained from the A/D-converter,
    comparing the scaled sensor readings directly to reference values corresponding to different directions to obtain a preliminary direction approximation, and
    determining the final direction by adding the preliminary direction approximation to a tabulated deflection and deviation value corresponding to the direction in question, said deflection and deviation value being created in the actual operating conditions and stored in a non-volatile memory.

7. A method for the determination of direction using a turnable indicator and two or more sensors secured on a frame and the operation of which is based on the dependence of the resistance of the magnetic material on a magnetic field exerted thereon, said method comprising the steps of:
    modifying the signals obtained from the sensors into digital form by means of an A/D-converter,
    scaling the sensor readings obtained from the A/D-converter,
    comparing the ratio of selected sensor readings to stored ratios to obtain a preliminary direction approximation, and
    determining the final direction by adding the preliminary direction approximation to a tabulated deflection and deviation value corresponding to the direction in question, said deflection and deviation value being created in the actual operating conditions and stored in a non-volatile memory.

8. The method according to claim 6 or 7, wherein the contents used in the scaling operation are calculated by turning said means around in a special test mode and by comparing the minimum and the maximum of the obtained signal values to desired minimum and maximum values.

* * * * *